Figure 1:
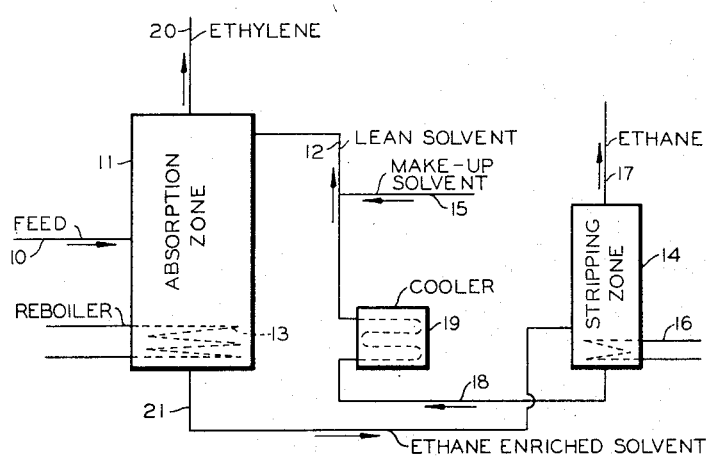

Patented Nov. 3, 1953

2,657,761

UNITED STATES PATENT OFFICE 2,657,761

METHOD OF SEPARATING ETHANE FROM HYDROCARBON MIXTURES

Martin R. Cines, Bartlesville, Okla., assignor to Phillips Petroleum Company, a corporation of Delaware Application June 12, 1950, Serial No. 167,611

16 Claims. (Cl. 183—115)

This invention relates to the separation of ethane from $C_2$ hydrocarbon streams. In one of its more specific aspects it relates to the separation of ethane from ethylene by selective absorption. In a specific embodiment this invention relates to the separation of ethane from ethylene using as the preferential solvent for ethane one or a mixture of perfluoroamines having the general formula

wherein $x$, $y$, and $z$ are 0 to 4.

The art of absorption is an old one, its first use in the petroleum industry probably being in natural gasoline plants where oil was and is used to selectively absorb gasoline from natural gas. The use of absorption as a means for separating materials has expanded to the separation of hydrocarbons of different degrees of saturation, i. e., paraffins from olefins, olefins from diolefins, paraffins from aromatics, etc.

Numerous methods have been devised for carrying out absorption processes such as liquid-liquid extraction, wherein a liquid component is separated from a mixture of liquids by a liquid solvent, gas-liquid extraction where a component in a gas stream is separated by a liquid absorbent, and the like. It has been found during the development of the extraction art that it is almost impossible to predict whether a particular hydrocarbon or hydrocarbon derivative will or will not extract a particular material. Thus, experimentation is the only sure way of determining whether a particular hydrocarbon or derivative may be used in a desired separation.

It is an object of this invention to recover ethane from $C_2$ hydrocarbon streams.

Another object of this invention is the separation of ethane from ethylene.

Another object is to provide a new solvent for ethane in the presence of ethylene or other $C_2$ hydrocarbons.

Still another object is to provide new solvents for ethane in the presence of ethylene comprising the group of perfluoroamines encompassed by the general formula

wherein $x$, $y$, and $z$ are 0 to 4.

Other objects and advantages of this invention will be apparent to one skilled in the art from the following discussion.

I have discovered an improved group of solvents for the separation of ethane from ethylene or ethane from $C_2$ hydrocarbon streams, said solvents preferentially dissolving the ethane to a degree much greater than that predicted. My invention embodies selectively absorbing ethane from ethylene or $C_2$ hydrocarbon streams utilizing a liquid perfluoroamine as the preferential solvent for ethane. The process of my invention can be carried out in numerous ways, and I do not intend to be limited by the particular method used. I have found countercurrent extraction to be particularly advantageous in the separation of ethane from other $C_2$ hydrocarbons. In such a process the $C_2$ hydrocarbon stream is introduced as a gas to about the midle of an extraction column. The liquid solvent, such as heptacosafluorotri-n-butylamine, is introduced near the top of the column. In this manner the rising gas contacts the solvent in countercurrent relationship so that the gas leanest in ethane contacts the fresh absorbent. Other methods of operation can also be used, such as intermittent batch operation, etc.

In operating my process the contacting means can be a bubble cap column, packed column, or other conventional equipment adaptable to gas-liquid or liquid-liquid extraction, the former generally being preferred. I usually prefer operating temperatures which are relatively low, but not below the freezing temperature of the solvent, which in the case of heptacosafluorotri-n-butylamine is $-26°$ F. Of course, when other amines of the group disclosed are used, this lower temperature limit may vary. I also prefer that the temperature should not be above about 150° F., the preferred temperature range generally being from 0 to 100° F. Operating pressures can be atmospheric or above, the preferred range being 0 to 300 p. s. i., and such that it is sufficient to maintain the perfluoroamine in liquid phase at the operating temperature used.

When the ethane-containing feed is introduced to the extraction column at or near the middle thereof, and the solvent is introduced in the vicinity of the top, the descending solvent preferentially dissolves the ethane portion of the rising gas. The gaseous overhead product thus is higher in ethylene content than the feed, and may be relatively pure, or may be only partially freed of ethane, depending on the gas:solvent ratio and the efficiency of the contacting. When the overhead is less than pure, or at least below the desired purity, it can be further purified, or the operating conditions of the absorber so adjusted as to provide a more pure product. The solvent, reaching the bottom of the column, is heated sufficiently to displace a portion of the dissolved ethane which rises in the column and displaces ethylene from the descending absorbent. The perfluoroamine and dissolved gas, which may be relatively pure ethane or a gas of greater ethane content than the feed, is withdrawn from the column and heated at about atmospheric pressure or reduced pressure, thus flashing the absorbed ethane. The solvent is then cooled and returned to the top of the column to repeat the cycle.

The unpredictability of my solvents bears out the fact that it is impossible to predict to any great extent just what materials will be separated by a particular solvent. As an example of this, it was found in experimental work that heptacosafluorotri-n-butylamine will not separate n-pentane from pentene-1. I have also found that my perfluoroamine solvents are preferentially selective for the unsaturated $C_4$'s over the saturated $C_4$'s having the same carbon chain configuration, as compared with a non-selective hydrocarbon such as mineral seal oil, which further bears out the fact that selectivity for ethane over ethylene by my solvents is unpredictable.

Other solvents of the group disclosed which may be used, in addition to heptacosafluorotri-n-butylamine, are branched chain perfluoroamines such as nonafluoro-sec-butyl undecafluoro-2-pentyl heptafluoropropyl amine, bis(pentafluoroethyl) heptafluoroisopropyl amine, pentafluoroethyl heptafluoro-n-propyl nonafluoro-sec-butyl amine, nonafluoro-n-butyl heptafluoro-n-propyl heptafluoroisopropyl amine and the like, along with the simple perfluoroamines covered by the structural formula disclosed.

Figure 2:
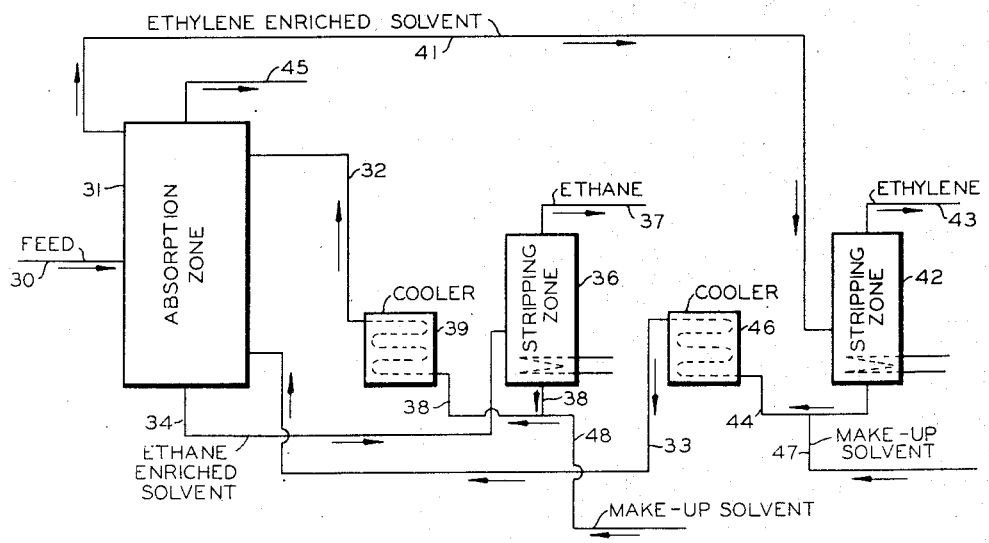

A further understanding of some of the many aspects of my invention are had by referring to the attached drawing, in which Figures 1 and 2 are schematic flow diagrams of two embodiments of my invention. Various additional valves, pumps, and other conventional equipment, necessary for the practice of this invention, will be familiar to one skilled in the art, and have been omitted from the drawing for the sake of clarity. The descriptions of the figures provide two methods of operating my process. It is understood, however, that while they are representative of my process, various minor changes in general may be made in adapting the process to the various conditions within the scope of the invention.

Refer now to Figure 1 which is a flow diagram of a single absorbent extraction process utilizing one of the solvents of my invention. A $C_2$ hydrocarbon stream containing ethane and ethylene is fed through line 10 to absorption zone 11, where it is contacted in the upper portion thereof in countercurrent relation with an absorbent of my invention introduced via line 12 at a temperature of 0 to 100° F. and a pressure of 50 to 300 p. s. i. A suitable volume ratio of liquid solvent to gas is in the range of 0.5:1 to 10:1. The ethane in the gaseous feed stream is preferentially absorbed as the solvent passes downward. As the enriched absorbent reaches the bottom of the absorption zone, it is heated in a suitable manner, such as by reboiler 13, to a temperature in the range of 10 to 50° F. higher than the absorption temperature, causing displacement of a portion of the dissolved ethane which rises in the column and in turn displaces absorbed ethylene or other material from the descending absorbent. Rich absorbent is withdrawn from the bottom of the absorption zone through line 21 and is passed therethrough to stripping zone 14, where the pressure is generally reduced to near atmospheric pressure, or as low as 50 mm. of mercury, and the temperature is elevated to 25 to 125° F. above the absorption temperature, but not so high that the vapor pressure of the solvent is excessive; thereby causing desorption of ethane. Suitable means for heating the enriched absorbent is reboiler 16, however, other means well-known to those skilled in the art can be readily used. Desorbed ethane is removed from the top of stripping zone 14 through line 17, while lean absorbent is removed from the bottom thereof through line 18 and is passed therethrough to cooler 19 where it is reduced in temperature to that desired for introduction to the absorption zone. Ethylene and other material, when present, are removed from the top of said absorption zone through line 20. Make-up solvent is added to the system through line 15.

Refer now to Figure 2 which is a flow diagram of a dual solvent process for separating ethane from a $C_2$ gas stream. A gas feed stream is passed through line 30 to absorption zone 31, where it is contacted in countercurrent relation with a solvent of my invention for ethane and a suitable solvent for ethylene, such as nitromethane or acetonitrile, pyridine, methylene chloride, propionaldehyde, acetone, etc. at a temperature in the range of 0 to 100° F. and a pressure of 50 to 300 p. s. i. A suitable volume ratio of combined solvents to gas is in the range of 0.5:1 to 10:1. The absorbent for ethane is introduced near the top of the absorption zone via line 32, while the absorbent for ethylene is introduced to the absorption zone near the bottom thereof through line 33. It is a necessary prerequisite of the solvents that they be substantially immiscible with one another so that separation of the two into phases may be accomplished readily. Maximum miscibility of one solvent in the other should not exceed 5 to 10 liquid volume per cent. The solvent for ethane passes downwardly through the column absorbing ethane from the feed gas as it goes, and is withdrawn at the bottom of the zone through line 34 and is passed to stripping zone 36. Stripping zone 36 is similar to zone 14 in Figure 1, and may be any conventional stripper which is operated at or near atmospheric pressure, such as atmospheric to 50 mm. of mercury, and slightly elevated temperatures in the range of 25 to 125° F. or above. Ethane is stripped from the enriched absorbent and removed from the stripping zone overhead via line 37. Lean absorbent is removed from the bottom of zone 36 via line 38, and is passed through cooler 39, where its temperature is reduced to that desired for admission to the absorption zone. From the cooler the lean absorbent is passed through line 32 as previously described, to zone 31. Absorbent rich in ethylene is withdrawn near the top of zone 31 via line 41, and is passed therethrough to stripping zone 42, which is also similar to the stripping zone 14 of Figure 1. Ethylene is recovered overhead from the stripping zone via line 43, while the lean absorbent is recovered from the bottom thereof through line 44, being passed therethrough to cooler 46, where its temperature is reduced in a manner similar to that of the solvent passing through cooler 39. Unabsorbed extraneous gas is removed from absorption zone 31 via line 45. Make-up absorbent may be added through lines 47 and 48, depending on which solvent is to be made up.

Obviously, other arrangements may be utilized employing my particularly advantageous solvents, however, mere apparatus arrangement is unimportant other than that relatively efficient absorption and stripping are desirable.

The following data, supplied for one of my solvents, show its selectivity for ethane above and beyond that which is expected.

Table

| Hydrocarbon | Temperature, °F. | Pressure, mm. Hg | Solubility, Std. cc¹/liter |
|---|---|---|---|
| Ethane | 91.5 | 749 | 1,132 |
| Ethylene | 95.0 | 749 | 601 |

¹ Cc. calculated at 760 mm. Hg and 32° F.

The data in the above table yield a ratio of solubility of ethane to solubility of ethylene in a perfluoroamine of 1.9. The expected ratio of these solubilities in a substantially non-selective hydrocarbon of about 200 molecular weight is 1.6, thus providing an increase in solubility of nearly 20 per cent.

Numerous advantages may be had by the practice of my invention. When a mixture of ethane and ethylene are being separated a relatively pure stream of ethane may be obtained. Or, if economics so dictate, a feed stream may be prepared for pure ethylene production which would contain a minor portion of ethane. (Such procedure might be quite advantageous in preparing a feed for ethylene polymerization.) This stream can then be treated with an additional portion of one or a mixture of my new solvents to provide pure ethylene. A procedure similar to this may be carried out in an advantageous manner when other materials are in the C₂ fraction to be separated besides ethane and ethylene. For example, the gas may be first treated with my solvent to remove ethane, then with a solvent for ethylene to separate it from other impurities. This same procedure may be also carried out, as disclosed, in a dual solvent process using countercurrent flow of immiscible solvents.

Although this process has been described and exemplified in terms of its preferred modifications, it is understood that various changes may be made without departing from the spirit and scope of the disclosure and of the claims.

I claim:

1. The separation of ethane from C₂ hydrocarbon streams using a selective solvent for ethane characterized by the formula

where $x$, $y$, and $z$ are 0 to 4.

2. The separation of ethane from ethylene by selective absorption utilizing a solvent for ethane characterized by the formula

where $x$, $y$, and $z$ are 0 to 4.

3. The separation of ethane from ethylene by selective absorption utilizing heptacosafluorotri-n-butylamine as the selective solvent for ethane.

4. A method for the selective absorption of ethane from a C₂ hydrocarbon stream which comprises contacting a C₂ hydrocarbon stream containing ethane in countercurrent flow with a solvent characterized by the formula

where $x$, $y$, and $z$ are 0 to 4, said solvent preferentially absorbing ethane, removing ethane enriched solvent and desorbing same, and recovering ethane of a purity higher than that in the C₂ hydrocarbon stream.

5. A method for the selective absorption of ethane from a gaseous C₂ hydrocarbon stream which comprises contacting a C₂ hydrocarbon stream containing ethane in countercurrent flow in an extraction zone with a solvent characterized by the formula

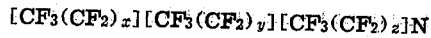

where $x$, $y$, and $z$ are 0 to 4, said solvent preferentially absorbing ethane as it passes downwardly through said zone, heating the enriched solvent in the bottom of said zone only sufficiently to desorb a minor portion of absorbed ethane, said desorbed ethane displacing other C₂ hydrocarbon in the downwardly moving solvent, passing the remaining ethane enriched solvent to a desorption zone where desorption is carried out by heating said enriched solvent, recovering ethane of a purity greater than in the C₂ hydrocarbon feed stream, and recycling lean solvent from said desorption zone to said extraction zone.

6. A method for the selective absorption of ethane from a mixture of ethane and ethylene which comprises countercurrently contacting such a mixture with a solvent selective for ethane comprising heptacosafluorotri-n-butylamine at a temperature above −26° F. and not above 150° F. in an absorption zone, said solvent preferentially absorbing ethane as it passes downwardly through said zone, heating the enriched solvent in the bottom of said absorption zone to a temperature in the range of 10 to 50° F. above that in the remainder of the absorption zone, thereby desorbing a minor portion of absorbed ethane, said desorbed ethane passing upwardly through said absorption zone and displacing ethylene from the downwardly moving solvent, passing the rich solvent from the bottom of said zone to a desorption zone where it is subjected to heating and pressure reduction to cause desorption of ethane, recovering ethane from said desorption zone of a purity higher than that in the feed stream, recycling desorbed solvent to said absorption zone, and recovering ethylene of a purity greater than that of the feed stream from the top of said absorption zone.

7. A method for the selective absorption of ethane from a gaseous mixture of ethane and ethylene which comprises countercurrently contacting such a mixture with a solvent selective for ethane comprising heptacosafluorotri-n-butylamine at a temperature in the range of 0 to 100° F. and a pressure in the range of 0 to 300 p. s. i., the ratio of gas to solvent being in the range of 0.5 to 10 liquid volumes of solvent per volume of gas, said solvent preferentially absorbing ethane as it passes downwardly through said absorption zone, heating the enriched solvent in the bottom of said absorption zone to a temperature in the range of 10 to 50° F. above that in the rest of the absorption zone and thereby causing a portion of absorbed ethane to be desorbed, said desorbed ethane passing upwardly through said absorption zone and displacing ethylene from the downwardly moving solvent, passing the rich solvent from the bottom of said zone to a desorption zone where it is subjected to heating to a temperature in the range of 25 to 125° F. above the major absorption zone temperature and pressure reduction in the range of atmospheric to 50 mm. of mercury, recovering ethane from said desorption zone of a purity higher than that in the feed stream, recycling cooled desorbed solvent to said absorption zone, and recovering ethylene of a purity greater than that of the feed stream from the top of said absorption zone.

8. A method for the selective absorption of ethane and ethylene from C₂ hydrocarbon streams containing same, which comprises introducing a solvent for ethane characterized by the formula

where $x$, $y$, and $z$ are 0 to 4, and a solvent for ethylene which is not more than 5 to 10 volume per cent miscible with the solvent for ethane at the opposite ends of an absorption zone and in countercurrent flow to one another, introducing a hydrocarbon stream containing ethane and ethylene to be separated intermediate the ends of said absorption zone, contacting said hydrocarbon stream with said solvents at a temperature above the freezing points of both of said solvents and not higher than 150° F. and a pressure in the range of atmospheric to 300 p. s. i., said solvents preferentially dissolving ethane and ethylene, removing ethane rich solvent from one end of said absorption zone and ethylene rich solvent from the opposite end thereof, passing said enriched solvents to separate desorption zones, desorbing said solvents by pressure reduction and heating, recovering desorbed ethane and ethylene from said desorption zones of purities greater than in said feed streams, and recycling desorbed solvents back to their respective ends of said absorption zone.

9. A process according to claim 8 wherein said solvent for ethylene is nitromethane and wherein the solvent for ethane is heptacosafluorotri-n-butylamine.

10. A process according to claim 8 wherein said solvent for ethylene is acetonitrile and wherein the solvent for ethane is heptacosafluorotri-n-butylamine.

11. A method for the selective absorption of ethane and ethylene from a mixture thereof, which comprises introducing a solvent for ethane characterized by the formula

where $x$, $y$, and $z$ are 0 to 4, and a solvent for ethylene which is not more than 5 to 10 volume per cent miscible with the solvent for ethane at the opposite ends of an absorption zone and in countercurrent flow to one another, introducing an ethane-ethylene mixture to be separated intermediate the ends of said absorption zone, contacting said mixture with said solvents at a temperature in the range of 0 to 100° F. and a pressure of 0 to 300 p. s. i., said solvents preferentially dissolving ethane and ethylene, removing ethane rich solvent from one end of said absorption zone and ethylene rich solvent from the opposite end thereof, passing said enriched solvents to separate desorption zones, desorbing said solvents by pressure reduction down to atmospheric to 50 mm. of mercury and heating to a temperature in the range of 25 to 125° F. above the absorption temperatures but below the boiling points of the solvents, recovering desorbed ethane and ethylene from said desorption zones of purities greater than in the feed mixtures, and recycling desorbed solvents to their respective ends of said absorption zone.

12. A process for the separation of ethane from a gaseous mixture containing C₂ hydrocarbons which comprises contacting said mixture with nonafluoro-sec-butyl-undecafluoro-2-pentyl heptafluoro-propyl amine as a selective solvent for ethane.

13. A process for the separation of ethane from a gaseous mixture containing C₂ hydrocarbons which comprises contacting said mixture with bis (pentafluoroethyl) heptafluoroisopropyl amine as a selective solvent for ethane.

14. A process for the separation of ethane from a gaseous mixture containing C₂ hydrocarbons which comprises contacting said mixture with pentafluoroethyl heptafluoro-n-propyl nonafluoro-sec-butyl amine as a selective solvent for ethane.

15. A process for the separation of ethane from a gaseous mixture containing C₂ hydrocarbons which comprises contacting said mixture with nonafluoro-n-butyl heptafluoro-n-propyl heptafluoroisopropyl amine as a selective solvent for ethane.

16. A process for the separation of ethane from a gaseous mixture containing C₂ hydrocarbons which comprises contacting said mixture with a perfluoroamine selected from the group consisting of nonafluoro-sec-butyl-undecafluoro-2-pentyl heptafluoro-propyl amine, bis (pentafluoroethyl) heptafluoroisopropyl amine, pentafluoroethyl heptafluoro-n-propyl nonafluoro-sec-butyl amine and nonafluoro-n-butyl heptafluoro-n-propyl heptafluoro-isopropyl amine and perfluoroamines having the general formula

wherein $x$, $y$, and $z$ are 0 to 4 as a selective solvent for ethane.

MARTIN R. CINES.

References Cited in the file of this patent

UNITED STATES PATENTS

| Number | Name | Date |
|---|---|---|
| 2,395,362 | Welling | Feb. 19, 1946 |

FOREIGN PATENTS

| Number | Country | Date |
|---|---|---|
| 583,874 | Great Britain | Jan. 1, 1947 |